United States Patent [19]
Dernbach et al.

[11] 3,845,879
[45] Nov. 5, 1974

[54] SAFETY FITTING

[75] Inventors: Berthold Dernbach; Ewald Jurisch, both of Erlangen; Helmut Landgraf, Tennenlohe, all of Germany

[73] Assignee: Siemens Aktiengesellschaft, Munich, Germany

[22] Filed: Mar. 26, 1973

[21] Appl. No.: 344,581

[30] Foreign Application Priority Data
Apr. 6, 1972  Germany.......................... 2216615

[52] U.S. Cl. ............................... 220/89 A, 137/68
[51] Int. Cl. ...................... F16k 17/16, B65d 47/36
[58] Field of Search .................................. 220/89 A; 137/68–71

[56] References Cited
UNITED STATES PATENTS

| | | | |
|---|---|---|---|
| 2,766,904 | 10/1956 | Philip | 220/89 A |
| 2,953,279 | 9/1960 | Coffman | 220/89 A |
| 2,954,897 | 10/1960 | Hansen et al. | 220/89 A |
| 3,445,032 | 5/1969 | Raidl, Jr. et al. | 220/89 A |
| 3,698,598 | 10/1972 | Wood et al. | 220/89 A |
| 3,704,807 | 12/1972 | Lidgard | 220/89 A |

*Primary Examiner*—John Petrakes
*Attorney, Agent, or Firm*—Kenyon & Kenyon Reilly Carr & Chapin

[57] ABSTRACT

A safety fitting for a pipe or vessel and contained within a flange coupling, the fitting being of the type which will close off flow as long as the pressure on one side of the fitting exceeds the pressure on the other side and will rupture to permit flow when the pressure on the other side exceeds that on the one side is shown. A rupture disc with radial grooves is placed on the one side which will normally be at higher pressure and is backed by a perforated support member placed on the other side such that under normal conditions the support member supports the rupture disc in the area of the grooves. If pressure on the other side exceeds that on the one side the disc is no longer supported and will rupture allowing flow through the fitting.

10 Claims, 7 Drawing Figures

SAFETY FITTING

BACKGROUND OF THE INVENTION

The present invention relates to safety fittings in general and more particularly safety fittings for pipes or vessels which are of the type which will close off flow as long as a higher pressure is maintained on one side of the fitting and rupture to permit flow through the fitting if the pressure on the other side exceeds that on the one side.

In various systems such as cooling systems, it is essential that a fluid flow be maintained even if a rupture in a primary system results in loss of the fluid therein. In systems of this nature, an emergency system to supply fluid under such emergency conditions is normally provided. The emergency system can be coupled to the normal system through a safety fitting of the type which will remain closed as long as the pressure in the normal system exceeds that of the emergency system but will open when the normal system pressure falls below that maintained in the emergency system. down. To avoid such a problem the emergency cooling system, obtaining its coolant from the tank V, and the emergency moderator system, obtaining coolant from sump S, are provided. It is essential that the emergency cooling systems be put into operation as soon as possible after a failure occurs. In addition, trouble occuring in measuring and control lines should not effect the starting of the emergency cooling which is vitally important.

In the system shown, the cooling pressure in the reactor circuit K will normally be about 100 bar. The liquid in tank V will be maintained at a pressure of, for example, 10 bar by a One type of device which will perform this function comprises basically a rupture disc and support member. The rupture disc is placed on the normal system side and is backed by the support member which is placed on the emergency system side. As long as normal pressure is maintained the disc is kept from rupturing. However, if a small differential pressure exists such that the emergency pressure is higher than the normal pressure, the disc will rupture and permit the fluid from the emergency system to flow into the normal system. Such safety fittings have fail-safe characteristics and operate quickly without having to overcome inertia. That is to say that even in the event of a very rapid pressure increase, they will release the full cross section of the pipe line in a very short time.

One particularly important application of such systems is in nuclear reactors. In such reactors it is normal to provide both a normal cooling system and an emergency cooling system, which will provide coolant should anything happen in the normal system. It is particularly important that, should a failure occur, causing the loss of normal coolant, the emergency coolant be supplied with a minimum delay so that no major damage to the reactor core occurs. Such a system will be used in the detailed description below for sake of example.

A type of rupture disc previously used comprises a preformed sheet of metal with a curvature which is placed in the direction of the higher normal pressure. Such discs normally have a flat rim portion which is clamped into a flange connection. The thickness of the sheet metal and the degree of deformation determine a release pressure for any given diameter. The release pressure is also dependent on the operating temperature at the safety fitting.

The convex side of the curved disc will naturally have a higher resistance to pressure than the concave side which faces the lower pressure of the emergency system. To further increase the resistance of the disc to pressure from the convex side, a support member made up of spherical segments is placed on the other side of the disc. Under normal conditions, the pressure in the normal system pushing against the disc and through the disc upon the segments will have a tendency to push them together to form a spherical support behind the disc and keep it from rupturing. However, if the pressure on the support member or emergency system side of the disc exceeds that on the normal side, the segments no longer tend to form a solid support but instead tend to go apart and permit the pressure to rupture the disc and release the full cross section. A fitting of this type has been found to have a number of serious disadvantages. In the first place, the pressure at which the disc will release or rupture is very imprecise. Further, the parts of the ruptured disc and the support can become separated when it breaks and get into the system of the installation. In addition, the difference between the release pressure and the operating pressure is relatively small and narrowly limited. This makes the manufacture of curved rupture disc quite difficult if the desired release characteristics are to be obtained.

Thus, it can be seen that there is a need for an improved rupture disc type safety fitting which provides the quick release needed and also allows ease of manufacturing and good control over release pressures. In addition, such a ruptured disc should have the characteristic that its segments cannot get into the system where it is being employed.

SUMMARY OF THE INVENTION

The present invention provides such a safety fitting in which a ruptured disc, which is preferably flat, has radial grooves extending out from its center to a predetermined distance from the edge. By not allowing the grooves to extend fully to the edge a solid annular area of full cross section is maintained which will prevent the ruptured disc portions from breaking off and entering the system. The disc is backed by a support member with the disc on the normal system (which will normally be at a high pressure) side and the support member on the emergency system side. The support disc is perforated with a plurality of holes so that it forms a sievelike member. Solid areas of the support member are kept aligned with the grooved portions of the rupture disc so that normal high pressures operating against the rupture disc cannot break through the grooved sections. The support member and rupture disc will be of a thickness such that they can withstand the operating pressure in the system where the fitting is employed which will be acting upon the rupture disc and so that the pressure will not punch through the disc in the areas over the holes. Systems which will operate at more than 100 bar have been designed.

As long as the operating pressure in the normal system remains higher than that in the emergency system the solid leg portions of the support member will continue to support the disc, particularly along the grooved sections and rupture of the fitting and flow therethrough cannot occur. However, should the pressure on the emergency side become higher than that of the normal side it will act through the holes in the support member on the full area of the rupture disc and cause it to rupture at the grooved portions. The pressure differential at which rupturing is required may be easily controlled by controlling the thickness of the grooves in the rupture disc with respect to its diameter.

DETAILED DESCRIPTION OF THE PREFERRED EMBODIMENT

Figure 1:
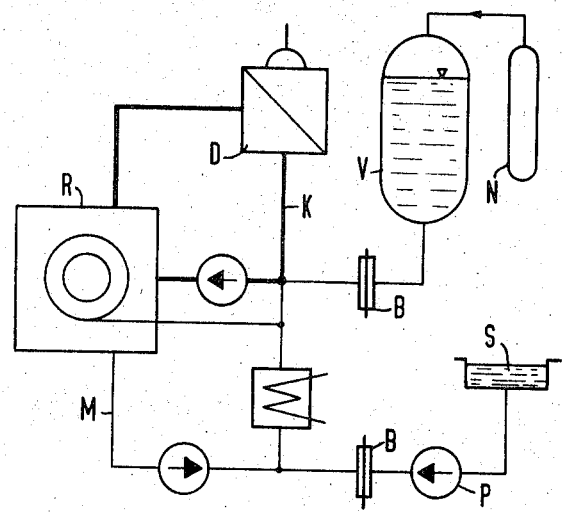
FIG. 1 is a schematic diagram of a typical nuclear reactor cooling system in which the safety fitting of the present invention may be employed.

FIG. 1 illustrates a typical cooling system for a water-moderated and water-cooled reactor. The reactor core R is normally supplied with coolant via a primary cooling system K. Water is supplied to the moderator via the system M. Coolant is supplied over the line K to the reactor R where it is converted to steam and used to drive a steam generator D after which it is condensed and cooled and provided back along line K. The cooling system K is coupled through a safety fitting B to a supply tank V which has a pressure maintained within it by a compressed gas bottle M. Also shown is a connection to the moderator system M through a second safety fitting B connecting it to a pump P which can draw water out of the sump S of the reactor.

If a break occurs in the cooling system K, the flow of coolant will be lost and the cooling of the fuel elements in the reactor R will not take place. This will cause the fuel elements to become hotter and hotter due to post decay heat and can eventually melt them even if the reactor is immediately shut compressed gas such as nitrogen from compressed gas tank N. The safety fitting B, will, thus, have a pressure of 100 bar on the side coupled to the normal coolant system and 10 bar on the side coupled to the emergency cooling system. As long as the higher pressure on the normal side is maintained the safety fitting B will remain closed. However, if the pressure in the normal system K drops below 10 bar by amount equal to the release pressure differential designed into the safety fitting B, it will open and coolant will be supplied from the tank V to the reactor R. As will be described below, the safety fitting of the present invention permits the differential pressure to be controlled through the design of the grooves in its rupture disc. Similarly, a failure in the moderator circuit M and a drop of normal pressure therein will permit a safety fitting B associated therewith to rupture and pump P will pump coolant from the sump S to provide emergency cooling.

Figure 2:
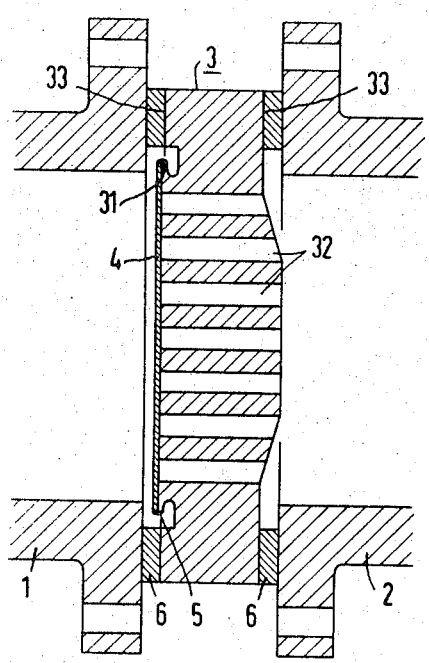
FIG. 2 is a longitudinal cross section of a first embodiment of the safety fitting of the present invention.
Figure 2A:
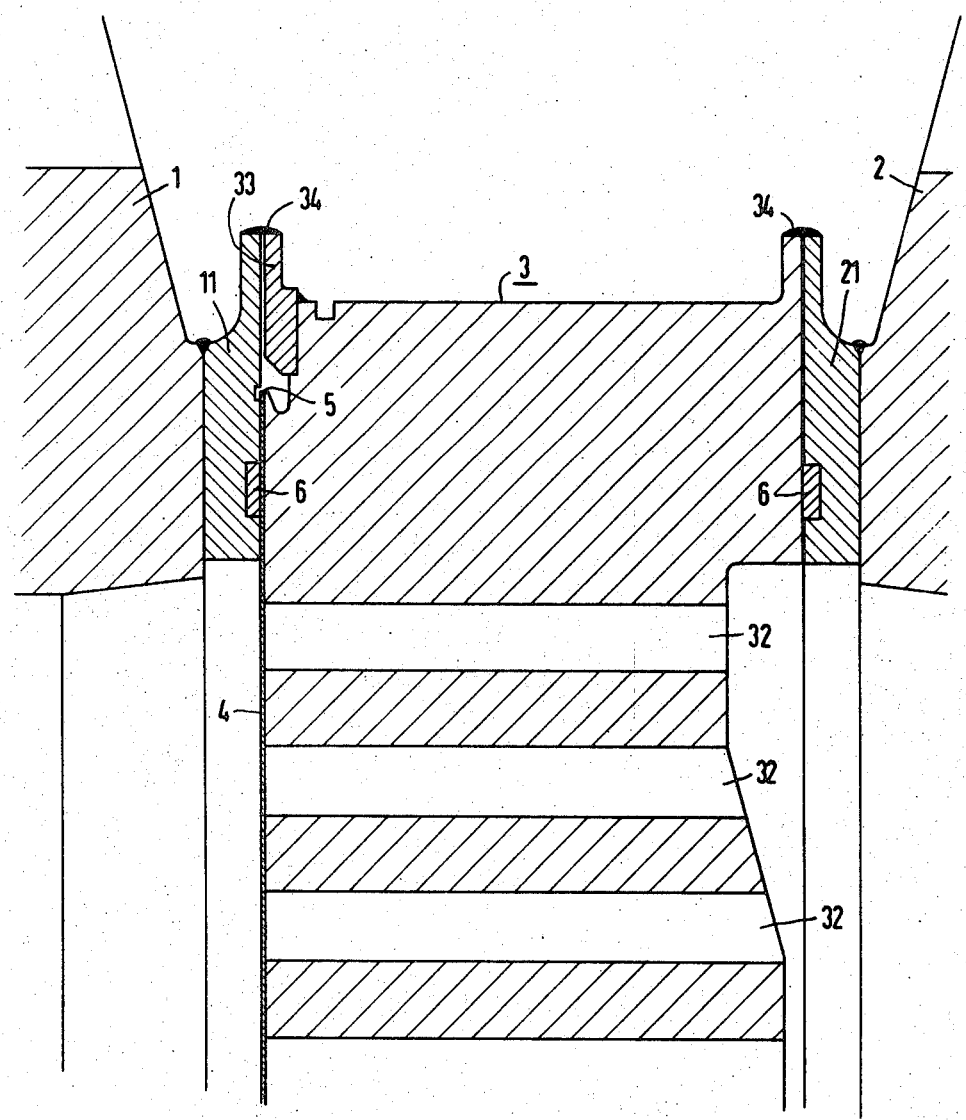
FIG. 2a is a longitudinal cross section of a second embodiment of the safety fitting.

A cross sectional view of the safety fitting B of FIG. 1 is shown on FIG. 2 and FIG. 2A. As shown, the safety fitting will preferably be built into a flange connection comprising pipe flanges 1 and 2. Sealing rings 6 will be placed between the safety fitting and the flanges 1 and 2, to maintain a tight connection. Held between the flanges 1 and 2 and sealing rings 6 is the support member designated generally as 3 with the rupture disc 4 resting against it. Rupture disc 4 is welded with its rim 5 secured tightly to a welding lip 31 of the support member 3. Alternatively, the disc 4 could be sealed separately within the flange using ordinary sealing washers.

FIG. 2A illustrates an alternate method of mounting. As in the embodiment of FIG. 2 the rim 5 of the rupture disc 4 is welded to the support plate 3. In addition, it has its full annular portion, i.e. the portion where no grooves are cut, clamped against the support member 3 with a diaphram welding ring 11. This will prevent any chance of the weld at 5 from tearing open when the disc is ruptured. To assure a good seal, a diaphram welding ring 34 is welded to the support member 3 and then welded to the diaphram welding ring 11 with a weld 34. Similarly, a welding diaphram ring 21 is welded to the other side of the support member 3 with an additional weld 34. The diaphram welding ring 11 and 21 are also welded respectively to the flanges 1 and 2. In this embodiment the sealing rings 6 are placed within grooves in the welding rings 11 and 21 respectively to provide additional sealing.

Figure 3:
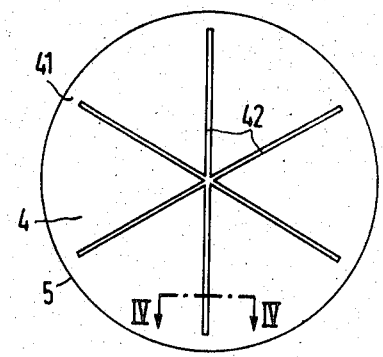
FIG. 3 is a plan view of the rupture disc of the safety fitting of FIG. 2.
Figure 4:
FIG. 4 is a cross section of a grooved portion of the disc of FIG. 3.

A plan view of the rupture disc is shown in FIG. 3 and a cross section through one of its groove sections shown on FIG. 4. Each of the grooves 42 extend from the center to a portion near the rim 5. This leaves an annular area 41 of undiminished cross section. Grooves 42 may be made by any of the known methods of cutting metals. Chemical etching and spark erosion methods have been found to be particularly suitable. However, grinding is also possible. Since the thickness of the wall which remains after the groove is cut is particularly important, this thickness being the control over the pressure at which the disc will rupture, the grooves must be made with the greatest care to maintain uniformity and accuracy. Of the above mentioned methods, chemical etching has been found to be the method which allows greatest control over these factors.

Figure 5:
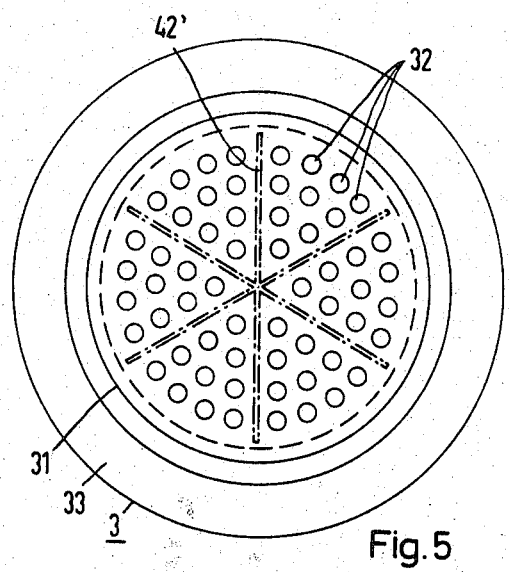
FIG. 5 is a plan view of the support member of the safety fitting of FIG. 2.

A plan view of the support member 3 is shown on FIG. 5. The rupture disc 4 is shown in dotted lines, positioned behind the support member 3. As shown thereon, and as can be seen from the cross sections of FIG. 2 and 2A, the support member 3 contains a plurality of holes 32 causing it to have a sieve like appearance. The pattern of the holes 32 is such that there are solid areas upon which the grooved portions of the ruptured disc, indicated on FIG. 5 as 42'; may rest. It is necessary that the grooves rest along these solid sections so that when the normal high pressure is applied against the face of the disc 4, it will not be able to push through the reduced cross section at the grooves 42, i.e. the full cross section is made such that the maximum pressure will not rupture the disc or punch it through one of holes 34. The reduced cross section if placed over a hole would be ruptured and pushed through at the hole. When the pressure on the support member side of the safety fitting exceeds that on the rupture disc side, the fluid will act against the disc 4 causing it to rupture along the grooves 44 and a fluid flow through the holes 32 will occur.

Figure 6:
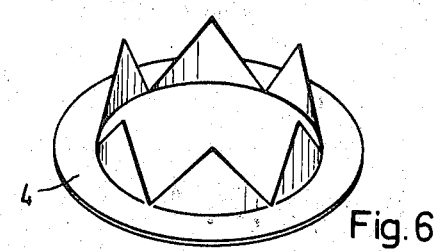
FIG. 6 is a perspective view of the rupture disc of FIGS. 2 and 3 in a ruptured condition.

The disc in its ruptured condition is shown on FIG. 6. As shown thereon, the rupturing of the disc along the lines 42 will cause triangular sections to be broken out and away from the center to permit flow of the emergency coolant through the safety fitting. The ruptured parts of the disc will rest against the inside of the pipe fitting 1 and because of the annular section 41 will not be able to break away and get into the cooling system.

In one application of this safety fitting a rupture disc having a diameter of 22 centimeters and a thickness of about 0.5 millimeters was constructed. The grooves were cut to leave approximately 0.15 mm of cross section remaining. With these dimensions the disc was found to rupture at a pressure of approximately 4 bar. The fitting was employed in a system wherein the fluid was water at a pressure of approximately 100 bar and a temperature of approximately 300°C. For such an application, the material which is preferably used is stainless steel. For other applications, other materials may be used as long as they will not be attacked by the fluid within the system at the particular operating pressures and temperatures within that system. For example, in some reactors pressures and temperatures even higher than those mentioned above are used. In these types of reactors, the fluid within the system will normally be a liquid metal or a gas. Even under these conditions, construction of a safety fitting according to the present invention presents no serious problems. Because the safety fittings are located outside the flowing portion of the normal system, they can have supplementary cooling supplied if necessary, to avoid breakdown of the safety fitting materials. Similarly, the sealing means within the flange connection can be adapted to meet the requirements of the system in which the safety fitting is installed using techniques and materials well known in the art.

It should be noted that the use of the safety fitting in a nuclear reactor was only used herein as an example. Such a safety fittings may also find use in other installations such as in chemical processes where stringent safety requirements are maintained. Similarly, the dimensions given in the example above, may be varied depending on the intended application of the safety fitting. In each case, the diameter of the rupture disc, the number and thickness of the grooves as well as the material to be used will be tailored to the particular application. In addition, other forms of lines 42 may be used, i.e. they need not be straight lines but may be curved lines, as long as the support member is designed so as to provide a solid support for all areas having reduced cross section because of the grooves.

Thus, an improved safety fitting of the rupture disc type which is simple to manufacture, provides good control over rupture pressures and will not permit ruptured segments to enter into the system in which it is installed has been shown. Although a specific embodiment has been shown and described, it will be obvious to those skilled in the art that various modifications may be made without departing from the spirit of the invention which is intended to be limited solely by the appended claims.

What is claimed is:

1. A safety fitting for use in pipe lines and the like comprising:
   a. a substantially flat rupture disc containing a plurality of radial grooves extending from the center to a predetermined distance from the rim of the disc thereby leaving annular area of undiminished cross section near the rim;
   b. a support member having a plurality of holes therein patterned so as to provide solid areas corresponding to the location of the grooves in said rupture disc; and
   c. means to support said rupture disc and said support member within a pipe line with said rupture disc resting against said support member with its grooves aligned with the solid areas of said support member, and facing the side of said pipe line in which a normally higher pressure is expected, whereby a higher pressure on said normal side of said line will press said rupture disc against said support member and prevent flow through the safety fitting but a higher pressure on the support member side of said safety fitting will cause said disc to rupture along said grooves and permit a flow through said safety fitting.

2. The invention according to claim 1, wherein the full thickness of said rupture disc and the diameter of said holes in said support member are such that normal system pressure will not cause said disc to rupture through said holes.

3. The invention according to claim 2 wherein the depth of the grooves in said rupture discs is of a thickness such as to cause the disc to rupture at a predetermined release pressure.

4. The invention according to claim 3 wherein the rupture disc is tightly welded to said support member at its rim and wherein said support member is sealingly supported within a pipe line flange connection.

5. The invention according to claim 4, wherein said support member is sealed by a pair of sealing rings placed respectively between one side of said support member and a first pipe flange and the other side of said support member and a second pipe flange.

6. The invention according to claim 3 wherein said rupture disc and said support member are sealingly supported within a pipe line flange connection.

7. The invention according to claim 6, wherein said rupture disc is also welded to said support member.

8. The invention according to claim 7 wherein said support member is sealed at least by welding.

9. The invention according to claim 8 and further including a pair of diaphram welding rings with one welded to each side of said support member and wherein said welding rings are welded to respective pipe line flanges.

10. The invention according to claim 9 wherein each of said welding ring contain an annular channel on its side which is welded to said support member and further including a pair of sealing ring placed in said channels between said welding rings and said support member.

* * * * *

UNITED STATES PATENT OFFICE
CERTIFICATE OF CORRECTION

PATENT NO. : 3,845,879
DATED : November 5, 1974
INVENTOR(S) : Berthold Dernbach et al It is certified that error appears in the above-identified patent and that said Letters Patent are hereby corrected as shown below:

In column 1, lines 22-34, cancel the following text and insert same in column 3, line 47 between 'shut' and 'compressed' :

...down. To avoid such a problem the emergency cooling system, obtained its coolant from the tank V, and the emergency moderator system, obtaining coolant from sump S, are provided. It is essential that the emergency cooling systems be put into operation as soon as possible after failure occurs. In addition, trouble occuring in measuring and control lines should not effect the starting of the emergency cooling which is vitally important.
    In the system shown, the cooling pressure in the reactor circuit K will normally be about 100 bar. The liquid in tank V will be maintained at a pressure of, for example, 10 bar by a ...

In column 4. line 24, change "welding ring" to --welding rings--

In column 4, line 30, change "in Fig. 3" to --on Fig. 3--

Signed and sealed this 29th day of April 1975.

(SEAL)
Attest:

RUTH C. MASON
Attesting Officer

C. MARSHALL DANN
Commissioner of Patents
and Trademarks